(12) United States Patent
Imura et al.

(10) Patent No.: US 10,868,487 B2
(45) Date of Patent: Dec. 15, 2020

(54) MOTOR DRIVE DEVICE CONFIGURED TO DETECT CAPACITOR DETERIORATION AND TO RESTRICT A MOTOR BASED UPON THE DETECTED DETERIORATION

(71) Applicant: DENSO CORPORATION, Kariya (JP)

(72) Inventors: Takashi Imura, Kariya (JP); Junya Oishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 37 days.

(21) Appl. No.: 16/221,823

(22) Filed: Dec. 17, 2018

(65) Prior Publication Data
US 2019/0199264 A1 Jun. 27, 2019

(30) Foreign Application Priority Data
Dec. 27, 2017 (JP) ................. 2017-252189

(51) Int. Cl.
*H02P 27/06* (2006.01)
*H02K 7/00* (2006.01)
(Continued)

(52) U.S. Cl.
CPC ............ *H02P 27/06* (2013.01); *H02K 7/006* (2013.01); *H02P 6/28* (2016.02); *H02P 31/00* (2013.01);
(Continued)

(58) Field of Classification Search
CPC ........ B60L 50/50; B60L 50/51; B60L 15/007; B60L 3/0061; B60L 58/16; B60L 58/12; B60L 3/04
See application file for complete search history.

(56) References Cited

U.S. PATENT DOCUMENTS 5,804,973 A * 9/1998 Shinohara ............... B60L 50/50
324/548
2010/0026225 A1 2/2010 Kamei et al.
(Continued)

FOREIGN PATENT DOCUMENTS

JP 2002-098725 A 4/2002
JP 2008-164453 A 7/2008
(Continued)

*Primary Examiner* — Rina I Duda
(74) *Attorney, Agent, or Firm* — Posz Law Group, PLC

(57) ABSTRACT

A motor drive device includes a storage unit that stores an initial value of a static capacitance correlation value of a static capacitance of a smoothing capacitor in an initial state, when the smoothing capacitor is connected to an inverter. A measurement unit of the motor drive device includes a timing generation circuit and a calculation unit. The measurement unit measures the static capacitance correlation value of the smoothing capacitor as a measured value at a time after the initial state. A determination unit of the motor drive device determines whether there is deterioration in the smoothing capacitor based on a relationship between the measured value and the initial value. A restrictor of the motor drive device restricts a maximum rotation number of a motor when capacitor deterioration is determined, thereby reducing a ripple current, limiting heat generation in the capacitor, and extending the product life of the capacitor, without increasing the number of parts in the motor drive device.

5 Claims, 6 Drawing Sheets

(51) Int. Cl.
  *H02P 6/28* (2016.01)
  *H02P 31/00* (2006.01)
  H02M 1/14 (2006.01)
  H02M 1/00 (2006.01)
  H02M 7/5387 (2007.01)
  H02P 29/60 (2016.01)

(52) U.S. Cl.
  CPC ............ *H02M 1/14* (2013.01); *H02M 7/5387* (2013.01); *H02M 2001/0038* (2013.01); *H02P 29/60* (2016.02)

(56) References Cited

U.S. PATENT DOCUMENTS

| | | | |
|---|---|---|---|
| 2010/0090628 A1* | 4/2010 | Endo | B60L 3/0092 |
| | | | 318/400.3 |
| 2011/0221400 A1* | 9/2011 | Takizawa | H01M 10/48 |
| | | | 320/166 |
| 2016/0087572 A1 | 3/2016 | Kato | |
| 2016/0315575 A1* | 10/2016 | Yamamoto | H02M 1/32 |
| 2018/0316279 A1 | 11/2018 | Imura | |

FOREIGN PATENT DOCUMENTS

| | | |
|---|---|---|
| JP | 2011-106987 A | 6/2011 |
| JP | 2014-193060 A | 10/2014 |

\* cited by examiner

MOTOR DRIVE DEVICE CONFIGURED TO DETECT CAPACITOR DETERIORATION AND TO RESTRICT A MOTOR BASED UPON THE DETECTED DETERIORATION

CROSS REFERENCE TO RELATED APPLICATION

The present application is based on and claims the benefit of priority of Japanese Patent Application No. 2017-252189, filed on Dec. 27, 2017, the disclosure of which is incorporated herein by reference.

TECHNICAL FIELD

The present disclosure relates to a motor drive device.

BACKGROUND INFORMATION

Motor drive devices may be used for powering an electric motor. Such motor drive devices may use an inverter to convert a DC power to an AC power for powering the motor. A filter including a smoothing capacitor may be used to filter the DC power prior to the input of the DC power into the inverter. The smoothing capacitor of the filter may begin to deteriorate over time.

The smoothing capacitor connected to the inverter deteriorates due to ripple current. In such cases, ripple current can be reduced by connecting a plurality of smoothing capacitors in parallel, and such a configuration may extend the life of the smoothing capacitor, but the motor drive device may require an increased number of parts to realize such effects. As such, motor drive devices are subject to improvement.

SUMMARY

It is an object of the present disclosure to provide a motor drive device (i.e., a motor driver) that is capable of extending the life of a smoothing capacitor without increasing the number of parts in the motor drive device.

According to the motor drive device of the present disclosure, when the smoothing capacitor deteriorates, the maximum rotation number of the motor may be limited or restricted. By restricting the maximum rotation number of the motor, it may be possible to reduce the ripple current, and hence limit heat generation in the smoothing capacitor. In such manner, it may be possible to slow the deterioration of the capacitor and extend the life of the smoothing capacitor without increasing the number of parts in the motor drive device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiments and modifications herein are described with reference to the drawings.

First Embodiment

First, a motor drive device of the present embodiment is described with reference to FIGS. 1 and 2.

Figure 1:
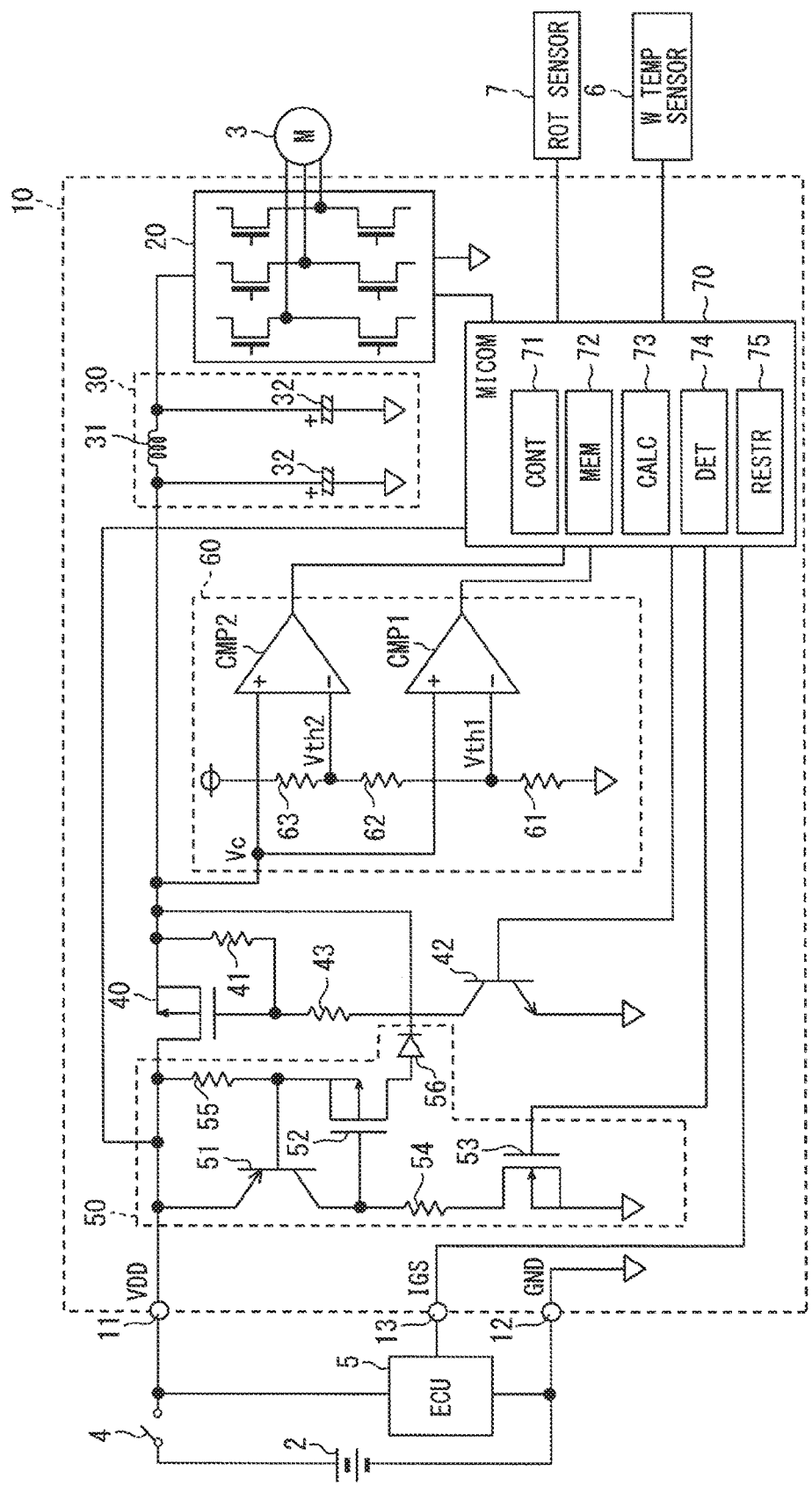
FIG. 1 is a schematic diagram of a motor drive device in a first embodiment of the present disclosure.

A motor drive device 10 (i.e., a motor driver 10) shown in FIG. 1 may be disposed or installed in a vehicle such as an automobile (not shown). The motor drive device 10 converts an electric power supplied from a direct current power supply such as a battery 2 to an alternating current, and outputs the alternating current to a three-phase electric motor 3 that may be part of a radiator fan.

The motor drive device 10 includes power supply terminals 11 and 12, and an ignition switch (IGS) terminal 13 as external connection terminals. The power supply terminal 11 is a terminal connected to a positive electrode of the battery 2. The power supply terminal 12 is a terminal connected to a negative electrode of the battery 2, that is, to the ground (GND) or return path. A power supply voltage VDD (for example, 12 V) is input to the power supply terminal 11. An IGS signal corresponding to an ON/OFF state of an igntion switch 4 is input at the IGS terminal 13.

The ignition switch 4 is disposed at a position between the battery 2 and the power supply terminal 11 on a high potential side (i.e., a power supply side) of a power supply line connected to the positive electrode of the battery 2. A signal indicating the ON/OFF state of the ignition switch 4 is input to a higher-level ECU, for example, an engine ECU 5. The engine ECU 5 outputs the IGS signal to the IGS terminal 13.

The motor drive device 10 includes an inverter 20, a filter 30, a power supply relay 40, a pre-charge circuit 50, a timing generation circuit 60, and a microcomputer 70.

The inverter 20 converts the direct current (DC) power supplied from the battery 2 into an alternating current (AC) power. The DC power input into the inverter 20 is first smoothed by a smoothing capacitor 32. The inverter 20 has upper and lower arm circuits. The upper and lower arm circuits are switching elements such as MOSFETs (Metal Oxide Semiconductor Field Effect Transistors) and IGBTs (Insulated Gate Bipolar Transistor) connected in series between a high potential power supply line and a low potential power supply line (e.g., a ground line). The low potential power supply line is connected to the negative electrode of the battery 2. The inverter 20 of the present embodiment has upper and lower arm circuits for three phases (e.g., a u-phase, a v-phase, and a w-phase), with each phase having an output corresponding to one of the three phases of the electric motor 3.

The filter 30 has an inductor 31 and the smoothing capacitor 32. The inductor 31 (e.g., a coil) is arranged on the high potential power supply line and is part of an LC filter together with the smoothing capacitor 32. The smoothing capacitor 32 is disposed at a position between the high potential power supply line and the low potential power supply line on a battery 2 side of the inverter 20. The smoothing capacitor 32 is connected in parallel with the inverter 20.

In the present embodiment, the two smoothing capacitors 32 and one inductor 31 form a π ((pi) filter 30, that is, a filter 30 having a π topology. When the power supply relay 40 is switched from OFF to ON, power is supplied to the inverter 20 from both of the battery 2 and the smoothing capacitor 32. In particular, a large electric power is momentarily supplied to the inverter 20 from the smoothing capacitor 32. Since an instantaneous maximum power supplied to the inverter 20 is proportional to the static capacitance of the inverter 20, a capacitor having a large static capacitance, such as an electrolytic capacitor, may be used as the smoothing capacitor 32.

The power supply relay 40 is provided at a position between the battery 2 and the filter 30. The power supply relay 40 is provided on at least one of the high potential power supply line and/or the low potential power supply line. In the present embodiment, a p-channel type MOSFET (p-type MOSFET) may be used as the power supply relay 40. The power supply relay 40 may be disposed at a position between the power supply terminal 11 and the filter 30 on the high potential power supply line. As shown in FIG. 1, the source of the p-channel power supply relay 40 is connected to the filter 30, and the drain of the power supply relay 40 is connected to the power supply terminal 11. The source of the power supply relay 40 is also connected to the gate of the power supply relay via a resistor 41.

The power supply relay 40 is switched from OFF to ON when the ignition switch 4 is turned ON. As a result, an electric power is supplied from the battery 2 to the smoothing capacitor 32 and the inverter 20. The motor drive device 10 includes a switch 42 for driving the power supply relay 40.

The switch 42 may be disposed at a position between the gate of the p-type power supply relay 40 (e.g., p-type MOSFET) and the low potential power supply line. In the present embodiment, the drive switch 42 is an npn bipolar junction transistor (BJT). As shown in FIG. 1, the collector of the switch 42 is connected to the gate of the power supply relay 40 via a resistor 43, and the emitter of the switch 42 is connected to the low potential power supply line (e.g., the ground line). The base of the switch 42 is connected to the microcomputer 70. When the switch 42 is turned ON, the gate of the power supply relay 40 is electrically connected to the low potential power supply line, and the power supply relay 40 is turned ON.

The precharge circuit 50 charges (e.g., precharges) the smoothing capacitor 32, prior to switching ON of the power supply relay 40. Again, as described above, the power supply relay may be switched on when the ignition switch 4 is switched ON. The charging performed by the precharge circuit 50 before the power supply relay 40 is switched on is called precharging. The precharge circuit 50 of the present embodiment is configured to bypass the power supply relay 40. One end of the precharge circuit 50 is connected to the power supply terminal 11 and another end of the precharge circuit 50 is connected to the positive electrode of the smoothing capacitor 32, The precharge circuit 50 has switches 51, 52 and 53; resistors 54 and 55; and a diode 56 for blocking reverse current.

In the present embodiment, a pnp bipolar junction transistor is used as the switch 51 and a p-channel type MOSFET is used as the switch 52. An n-channel type MOSFET is used as the switch 53. As shown in FIG. 1, the emitter of the switch 51 is connected to the high potential power supply line (i.e., to the power supply terminal 11), and the collector of the switch 51 is connected to the drain of the switch 53 via, the resistor 54. The base of the switch 51 is connected to the source of the switch 52.

The source of the switch 52 is connected to the emitter of the switch 51 via the resistor 55 for restricting an electric current, and the drain of the switch 52 is connected to the anode of the diode 56. The gate of the switch 52 is connected to the collector of the switch 51. The source of the switch 53 is connected to the low potential power supply line (i.e., to the ground), and the gate of the switch 53 is connected to the microcomputer 70. The cathode of the diode 56 is connected to the positive electrode of the smoothing capacitor 32. During the precharging by the precharge circuit 50, an electric current flows via the resistor 55, the switch 52, and the diode 56, to the smoothing capacitor 32 for charging the smoothing capacitor 32. Such an electric current is called a precharge current.

The timing generation circuit 60 has comparators CMP1, CMP2 and resistors 61, 62, and 63. The resistors 61, 62, and 63 are connected in series between a constant voltage source and the ground. The resistor 61 is arranged on the ground side of the series connection, and the resistor 63 is arranged on the constant voltage source side of the series connection. The resistor 62 is provided at a position between the resistors 61 and 63. A predetermined voltage supplied by the constant voltage source is divided by the resistors 61, 62, and 63 to respectively generate the first threshold voltage Vth1 and the second threshold voltage Vth2.

The first threshold voltage Vth1 is a voltage at a connection point between the resistors 61 and 62. As a result, the first threshold voltage Vth1 is set to be a voltage higher than zero (0) V The first threshold voltage Vth1 may be set as a value obtained by adding a margin to the minimum operating voltage of the comparators CMP1 and CMP2. For example, the first threshold voltage Vail may be 1 V The second threshold voltage Vth2 is a voltage at a connection point between the resistors 62 and 63. The second threshold voltage Vth2 is higher than the first threshold voltage Vth1. The second threshold voltage Vth2 may be set as a voltage lower than the minimum operation voltage of the motor 3 (e.g., 8 V). The constant voltage source and the resistors 61, 62, and 63 may be used to set the second threshold voltage Vth2, and the second threshold voltage Vth2 may be, for example, 7.5 V The first threshold voltage Vth1 may be referred to simply as a first threshold, and the second threshold voltage Vth2 may be referred to simply as a second threshold.

A voltage Vc, that is, an inter-terminal voltage of the smoothing capacitor 32 is input to a non-inverting input terminal of the comparator CMP1, and the threshold voltage Vth1 is input to an inverting input terminal of the comparator CMP1. The comparator CMP1 compares the voltage Vc with the threshold voltage Vth1, and outputs a comparison result to the microcomputer 70. The voltage Vc is input to an non-inverting input terminal of the comparator CMP2, and the threshold voltage Vth2 is input to an inverting input terminal of the comparator CMP2. The comparator CMP2 compares the voltage Vc with the threshold voltage Vth2, and outputs the comparison result to the microcomputer 70. The output switch timing for the comparators CMP1 and CMP2, that is, the time where an output from a comparator switches from an low "L" level to a high "H" level, is different among the comparators CMP1 and CMP2.

The microcomputer 70 includes a CPU, microprocessor, or like processing unit, memory, and input/output U/O) circuitry (all not shown). The processes performed by the microcomputer 70, for example, those processes described with reference to FIGS. 2, 4, 7, and 10, may be performed when the processor of the microcomputer 70 executes a program or instruction set stored in the memory of the microcomputer 70, where execution of the program causes the microcomputer 70, sometimes working along with other components, to perform the processes in the program/instruction set. The memory may be a substantive, non-transitory storage medium. The memory may be, for example, a RAM, a ROM, and a flash memory.

The microcomputer 70 also includes a control unit 71, a storage unit 72, a calculation unit 73, a determination unit 74, and a restriction unit 75. The components of the microcomputer 70, that is, the control unit 71, the storage unit 72, the calculation unit 73, the determination unit 74, and the restriction unit 75 may be realized as software, hardware, or a combination of software and hardware. When the components of the microcomputer 70 are realized as software, that is, when the microcomputer 70 executes a program/instruction set stored in memory, the control unit 71, the storage unit 72, the calculation unit 73, the determination unit 74, and the restriction unit 75 may be considered as functional blocks of the microcomputer 70. However, each of the the control unit 71, the storage unit 72, the calculation unit 73, the determination unit 74, and the restriction unit 75 may be realized as hardware. For example, the control unit 71, the storage unit 72, the calculation unit 73, the determination unit 74, and the restriction unit 75 may be realized as circuits with analog components, digital components, and logic circuitry configured to perform processes associated with each of the components, as described below in greater detail. For example, the storage unit 72 may be the above-described memory for storing a program/instruction set, and other data. The control unit 71, the storage unit 72, the calculation unit 73, the determination unit 74, and the restriction unit 75 may also be configured as specialized hardware, such as application-specific integrated circuits (ASICs) or field-programmable gate arrays (FPGA) that are configured to perform the processes associated with and corresponding to each of the components.

The description may generally describe the processes as being performed by the microcomputer 70 or may specifically describe processes performed by the components of the microcomputer 70.

The power supply voltage VDD may be stepped down, for example, via a step-down converter (not shown) to supply an operating voltage to the microcomputer 70. In such manner, the microcomputer 70 can be operated before the power supply relay 40 is turned ON.

The control unit 71 is configured to control the power supply relay 40 and the precharge circuit 50. That is, the control unit 71 functions to control, or more specifically, performs a function/process to control, the supply of electric power to the inverter 20. The control unit 71 outputs a relay control signal to control the ON/OFF switching of the power supply relay 40 to the base of the switch 42. The control unit 71 outputs a precharge control signal to the gate of the switch 53 for controlling the precharging by the precharge circuit 50.

When the ignition switch 4 is turned ON, the IGS signal transitions from a low "L" level signal to a high "H" level signal. While the control unit 71 initially outputs a low "L" level signal as a relay control signal, upon receiving the "H" level IGS signal, the control unit outputs an H level precharge control signal. As a result, the switch 42 is turned. OFF, and the power supply relay 40 is not turned. ON, that is, the power supply relay 40 remains OFF. On the other hand, the switch 53 is turned ON.

When the switch 53 is turned ON, a collector current flows through the switch 51, and the switch 52 is turned ON. When the switch 52 is turned ON, a precharge current flows through the resistor 55, the switch 52, and the diode 56, to the smoothing capacitor 32, and the smoothing capacitor 32 is precharged by the precharge current. When the voltage Vc rises to become substantially equal to the power supply voltage VDD, the precharge current stops flowing, and the precharge process (i.e., precharging or precharge) is complete.

When the precharging of the smoothing capacitor 32 is completed, the control unit 71 transitions the output of the precharge control signal from the H level to the L level to turn OFF the switch 53. In other words, when the precharge is complete, the control unit 71 outputs an L level control signal to turn OFF the switch 53. When a predetermined amount of time has elapsed after the precharge is completed, the control unit 71 outputs an H level relay control signal. As a result, the switch 42 is turned ON, and the power supply relay 40 is turned ON. By precharging the smoothing capacitor 32 before the power supply relay 40 is turned ON, an inrush current to the inverter 20 can be suppressed.

The control unit 71 is also configured to control the inverter 20 (i.e., the control unit 71 functions to control, i.e., performs a process to control, the inverter 20), A detection signal for measuring a water temperature from a water temperature sensor 6, and a detection signal from a rotation sensor 7 that detects a rotation of the motor 3, are input to the microcomptuer 70. The control unit 71 controls the inverter 20 based on the detection signal from the water temperature sensor 6 and the detection signal from the rotation sensor 7. The control unit 71 performs a PWM control for switching the switching elements (i.e., ON/OFF) in inverter 20.

The control unit 71 performs a closed-loop control or an open-loop control depending on the detection signal of the water temperature sensor 6. That is, the control unit 71 performs either a closed-loop control or an open-loop control based on the water temperature. The closed-loop control may also be referred to as a feedback control. When the water temperature is lower than a predetermined value, the control unit 71 performs a closed-loop control based on (i) a target rotation number that is set based on the above-described water temperature, and (ii) an actual rotation number of the motor 3 based on the detection signal of the rotation sensor 7.

On the other hand, when the water temperature is equal to or higher than the predetermined value, the control unit 71 performs an open-loop control. The control unit 71 sets a duty ratio of the PWM signal so as to rotate the motor 3 at the maximum rotation number regardless of the target rotation number that is set based on the water temperature.

As such, the rotation range of the motor 3 has two rotation number ranges, that is, (i) a normal operation range realized by an execution of the closed-loop control, and (ii) a maximum rotation number range with a higher number of rotations than the normal operation range realized by an execution of the open-loop control. The maximum rotation number range has a higher number of rotations than an upper limit of the normal operation range. The maximum rotation number of the motor 3 is set to be included in the maximum rotation number range. In other words, the motor has a motor rotation range, that includes a normal operation range controlled by a closed-loop control where the motor rotates at a normal rotation number within the normal operation range, and a maximum rotation number range controlled by an open-loop control where the motor rotates at the maximum rotation number within the maximum rotation number range, where the maximum rotation number is greater than the normal rotation number.

The storage unit 72 stores an initial value of the static capacitance correlation value, that is, a value correlated with a static capacitance of the smoothing capacitor 32 when the smoothing capacitor 32 in an initial state (e.g., in a shipment state, where the vehicle igntion 4 has been initially turned on for the first time, but prior to the vehicle being shipped from the place of manufacture). In the present embodiment, the static capacitance correlation value stored in the storage unit 72 is correlated with the static capacitance of a brand-new smoothing capacitor 32 when the new vehicle is shipped from the factory, or more specifically, when a vehicle having the motor drive device 10 is shipped from the place of manufacture.

The calculation unit 73 calculates a static capacitance correlation value of the smoothing capacitor 32 based on the output of the timing generation circuit 60. As such, when the timing generation circuit 60 and the calculation unit 73 function together as a working pair to measure the static capacitance correlation value, the timing generation circuit 60 and the calculation unit 73 may be referred to as a measurement unit. A static capacitance correlation value of the smoothing capacitor 32 is "measured" by the timing generation circuit 60 and the calculation unit 73. In other words, the "measured value" is a value measured after the measurement of the initial value of the static capacitance correlation value. The measured value is a value measured at a present measurement cycle/operation, that is, during the current operation of the motor drive device 10, and the initial value is a value measured during a past measurement cycle/operation (e.g., at the initial state, shipment state).

The determination unit 74 determines whether the smoothing capacitor 32 has deteriorated based on (i) the "measured" value that is calculated by the calculation unit 73, and (ii) the initial value stored in the storage unit 72. The static capacitance of the smoothing capacitor 32 decreases due to deterioration of the smoothing capacitor 32. The determination unit 74 determines the deterioration of the smoothing capacitor 32 based on the change of the static capacitance correlation value over time.

When the determination unit 74 determines that the smoothing capacitor 32 has deteriorated, the restriction unit 75 limits/restricts the maximum rotation number of the motor 3. The restriction unit 75 restricts the maximum rotation number in instances where the smoothing capacitor 32 has deteriorated. The restriction unit 75 may restrict the maximum rotation number in cases of smoothing capacitor 32 deterioration (i.e., a deterioration-based maximum rotation number) to (i) a number within the maximum rotation number range described above, and to (ii) a number that is lower than the maximum rotation number when there is no deterioration of the smoothing capacitor 32 (i.e., "a deterioration-free maximum rotation number").

The deterioration determination process performed by the microcomputer 70 for determining whether there is any deterioration in the smoothing capacitor 32 is described with reference to FIGS. 2 to 5.

When the ignition switch 4 is turned ON and the IGS signal transitions changes) to the H level, the microcomputer 70 starts the deterioration determination process described below. The microcomputer 70 performs the deterioration determination process when the microcomputer 70 starts. The microcomputer 70 increments a counter when starting the deterioration determination process.

Figure 2:
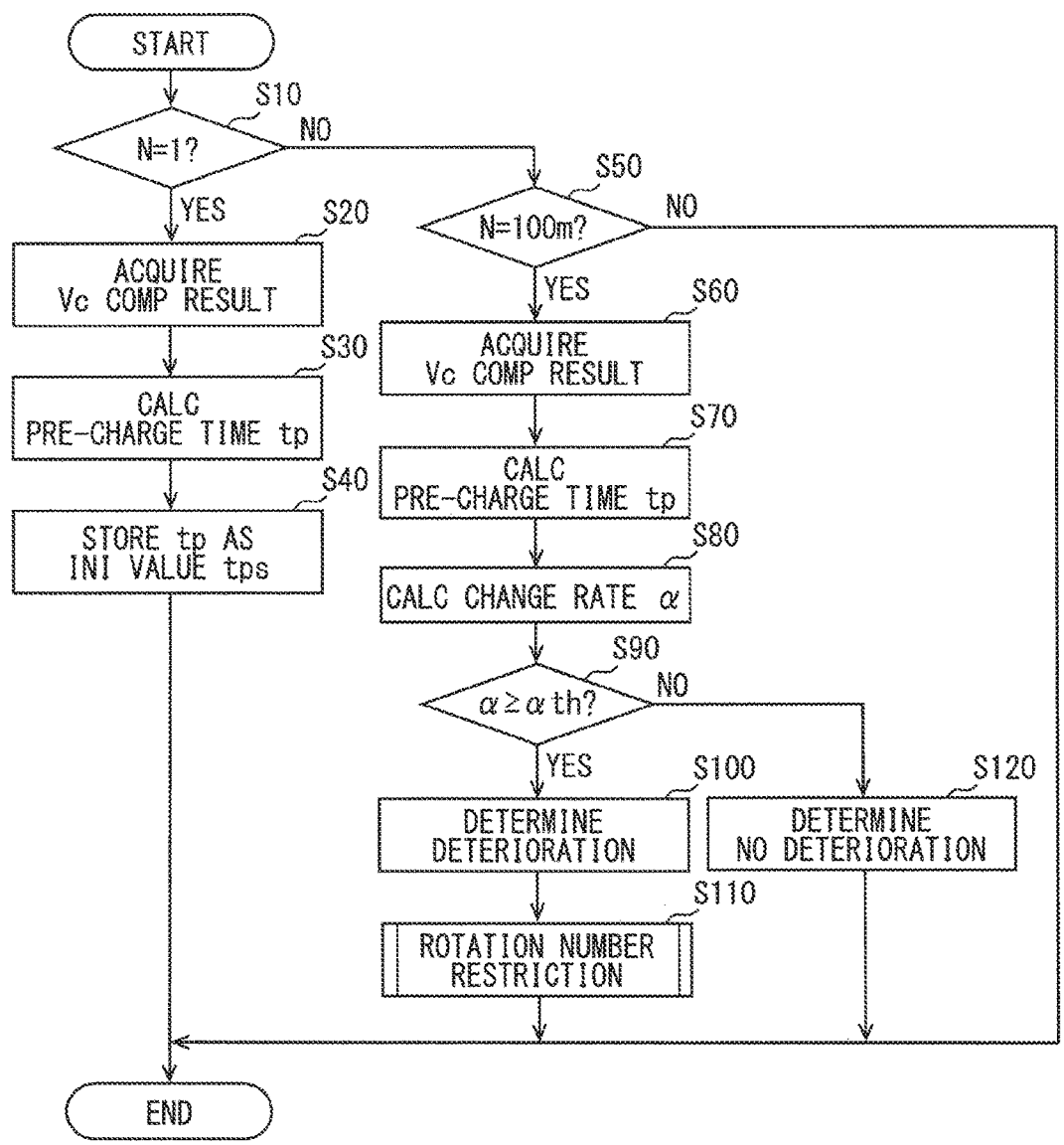
FIG. 2 is a flowchart of a process performed by a microcomputer.

As shown in FIG. 2, at S10, the microcomputer 70 first determines whether an ON number "N" of the ignition switch 4 has a value of one "1," The ON number N is set to 1 (i.e., N=1) the first time the ignition is turned ON after the vehicle is manufactured. In the present embodiment, the shipment state is set as the initial state, and the microcomputer 70 determines at S10 whether the initial state is set at the time of vehicle shipment. In other words, N=1 means that the vehicle ignition switch has been switched on after the vehicle has been manufactured, the vehicle and the motor drive device 10 are in the initial state (i.e., the initial state has been set), and that the vehicle and the motor drive device 10 are ready to be shipped from the factory. The shipment state is a lime after a manufacture of a vehicle in which the motor drive device 10 is installed, after the ignition switch 4 is initially switched ON for a first time, prior to the vehicle leaving the place of manufacture.

When the microcomputer 70 determines that the initial state is set, i.e., "YES" at S10, the process moves to S20 and the calculation unit 73 of the microcomputer 70 acquires the comparison result of the voltage Vc at S20. As the comparison result, the calculation unit 73 acquires the outputs of the comparators CMP1 and CMP2 from the timing generation circuit 60. At S30, the calculation unit 73 calculates a precharge time tp on the basis of the output from the comparators CMP1 and CMP2. Here, the precharge time tp is a static capacitance correlation value.

Figure 3:
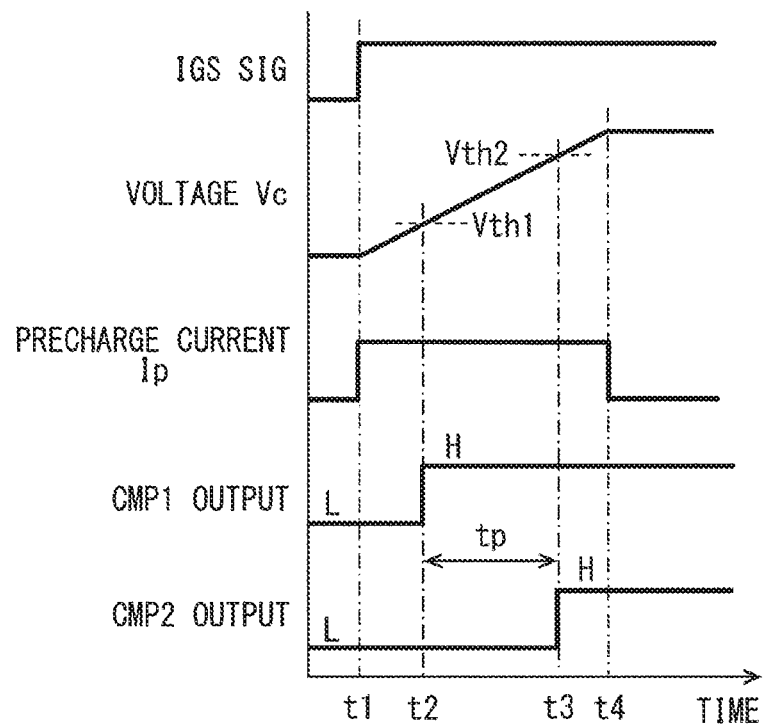
FIG. 3 is a timing chart of operations when the motor device starts.

FIG. 3 is a timing chart illustrating the precharge time tp. When the ignition switch 4 is turned ON, the IGS signal changes to the H level at time t1. At time t1, the switch 52 is turned. ON, the precharge current Ip flows, and the voltage Vc starts to rise. When the voltage Vc reaches the threshold voltage Vth1 at time t2, the output of the comparator CMP1 switches from the L level to the H level. The voltage Vc further rises and reaches the threshold voltage Vth2 at time 13. As a result, the output of the comparator CMP2 also switches from the L level to the H level at time t3, Then, at time t4, the voltage Vc becomes substantially equal to the power supply voltage VDD, and the precharge current Ip stops flowing.

The calculation unit 73 calculates the precharge time tp which is a difference between time t2 and time t3. When the static capacitance of the smoothing capacitor 32 decreases due to the deterioration of the smoothing capacitor 32, the capacitor 32 may be charged more quickly, that is the charging is faster, and the slope (e.g., as shown in FIG. 3) of the voltage Vc increases, i.e., becomes steeper. As such, the precharge time tp indicates a static capacitance correlation value. At S20, the calculation unit 73 of the microcomputer 70 acquires the outputs of the comparators CMP1 and CMP2 starting at a time before time t2 to at least time t3.

At S40, the microcomputer 70 stores the precharge time tp calculated at S30 as the initial value tps in the storage unit 72 and the process then ends.

At the second and subsequent ignition ON, that is, when the ignition is subsequently turned ON after the ignition is switched ON for the first time, the microcomptuer 70 determines at S10 that N≠1, i.e., "NO" at S10, and the process proceeds to S50. At S50 the microcomputer 70 determines whether the number N of times the ignition switch 4 is switched. ON is equal to 100 m, where "m" is a multiplier value. The number m is a natural number e.g., 1, 2, 3). In the present embodiment, the microcomputer 70 performs a deterioration determination for the smoothing capacitor 32 when the ON number N reaches a predetermined number. That is, the deterioration determination is performed when the igntion 4 has been turned ON a certain amount of times N and not every time the igntion switch is turned ON. In this case, when the microcomputer 70 determines that the number of times N the ignition has been turned on is not a multiple of 100 (e.g., 100 m), i.e., "NO" at S50, the process ends and the microcomputer does not perform a deterioration determination for the smoothing capacitor 32.

However, when the microcomptuer 70 determines that N is a multiple of 100 (e.g., 100 m) at S50, i.e., "YES" at S50, the process proceeds to S60. At S60, the calculation unit 73 of the microcomputer 70 acquires the comparison result of the voltage VC, and at S70, the calculation unit 73 calculates the precharge time tp. The processes performed by the calculation unit 73 at S60 and S70 are the same processes described above with reference to S20 and S30.

At S80, the determination unit 74 of the microcomputer 70 calculates a change rate α by using the precharge time tp calculated at S70 and the initial value tps stored in the storage unit 72. That is, the change in the static capacitance correlation value over a period of time (e.g., a time lapse) is calculated. The change rate α is calculated as shown in equation 1.

$$\alpha = \{(tps-tp)/tps\} \times 100 \quad \text{(Equation 1)}$$

At S90, the determination unit 74 determines whether the calculated change rate α is equal to or greater than a preset threshold αth. Here, a value of about 30% is generally set as the change rate of the static capacitance for determining the product life of the smoothing capacitor 32 (e.g., an electrolytic capacitor). That is, the microcomputer 70 may use the change rate α to estimate (i.e., determine) a deterioration failure of the smoothing capacitor 32 (i.e., estimate the product life of the smoothing capacitor 70). As such, the threshold value αth for making the deterioration determination is set to a value smaller than the product life determination value.

At S100, when the change rate α is equal to or greater than the threshold value αth, the determination unit 74 determines that the smoothing capacitor 32 is deteriorated. When the determination unit 74 determines that the capacitor 32 has deteriorated, i.e., "YES" at S100, the process proceeds to S110 and the restriction unit 75 of the microcomputer 70 performs a rotation number restriction process for restricting the maximum rotation number of the motor 3.

Figure 4:
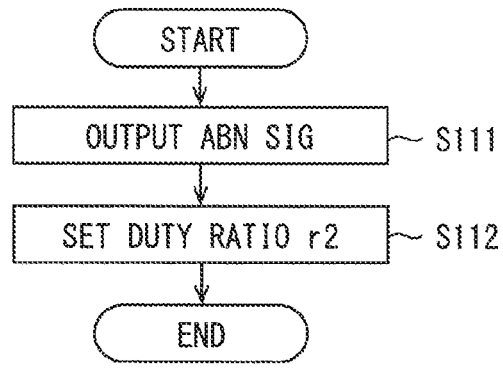
FIG. 4 is a flowchart of a rotation number restriction process.

As shown in FIG. 4, at S111 the restriction unit 75 outputs an abnormality signal indicating the deterioration in the smoothing capacitor 32 to the higher-level engine ECU 5. As a result, the engine ECU 5 adapts its control on the basis of the abnormality signal indicating the deterioration in the smoothing capacitor 32.

At S112, the restriction unit 75 changes the duty ratio so that the maximum rotation number set within the maximum rotation number range takes a value lower than the deterioration-free maximum rotation number. Specifically, r2 is set as the duty ratio.

Figure 5:
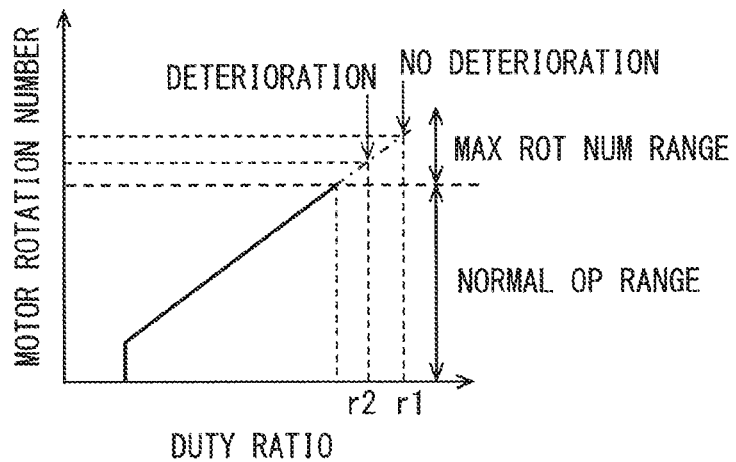
FIG. 5 is a relational diagram of a duty ratio and a motor rotation number.

In the normal operation range shown in FIG. 5, the motor 3 is under the closed-loop control as described above. On the other hand, in the maximum rotation number range, the motor 3 is under the open-loop control. In a case of no deterioration, a duty ratio r1 is set, but in cases where there is deterioration, the duty ratio r2 is set to restrict the rotation number to be lower than the no deterioration case, where in this case, the duty ratio r2 is smaller than the duty ratio r1. In such manner, the restriction unit 75 sets the duty ratio r2 as a duty ratio corresponding to the maximum rotation number. As a result, the control unit 71 outputs the duty ratio r2 when the water temperature is equal to or higher than the predetermined value, and the maximum rotation number of the motor 3 is restricted.

After the microcomputer 70 performs the process at S110, the process in FIG. 2 ends. At S90, when the determination unit 74 determines that the value α is less than the threshold value αth, i.e., "NO" at S90, the process proceeds to S120 and the determination unit 74 determines that the smoothing capacitor 32 has not deteriorated. After the microcomputer 70 performs the process at S120, the process shown in FIG. 2 ends. As described above, S80, S90, S100, and S120 are performed by the determination unit 74.

The motor drive device 10 of the present embodiment may achieve the following advantageous effects.

According to the motor drive device 10 of the present embodiment, the deterioration of the smoothing capacitor 32 is determined based on (i) the initial value, which is a static capacitance correlation value of the capacitor 32 in its initial state, and (ii) the measured value. When the microcomputer 70 determines that there is deterioration in the smoothing capacitor 32, the maximum rotation number of the motor 3 is restricted.

Since the maximum rotation number is restricted in such manner, it is possible to reduce the ripple current, and hence to limit the heat generated in the smoothing capacitor 32. As such, the further deterioration of the smoothing capacitor and other vehicle components can be limited. Thus, it is possible to extend the product life of the smoothing capacitor 32 without increasing the number of parts, e.g., the number of the smoothing capacitors 32.

Figure 6:
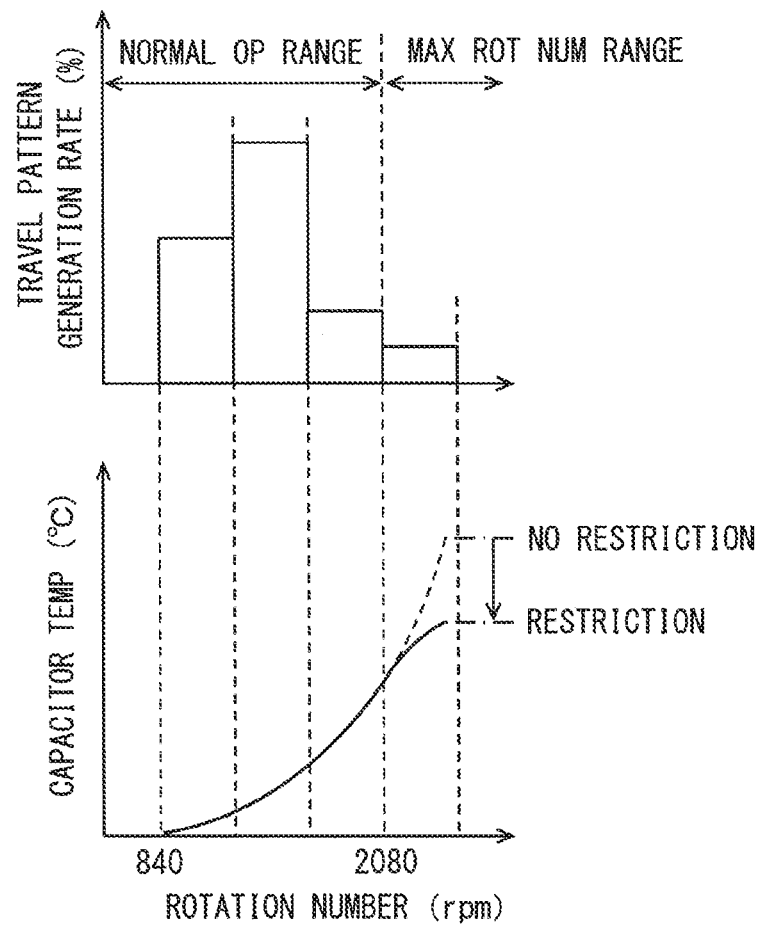
FIG. 6 is a diagram of effects due to restricting the rotation number.

The maximum rotation number in the open-loop control is restricted. That is, the maximum rotation number in the open-loop control is not the maximum rotation number in the closed-loop control, that is, the upper limit of the number of rotations in the normal operation range by the closed-loop control. As shown in FIG. 6, a travel pattern generation rate is lower in the maximum rotation number range than in the normal operation range. The travel pattern generation rate may refer to the rotation rate of an electric motor (e.g., motor 3) based on usage. However, since the maximum rotation number with a high value is restricted in the present embodiment, the capacitor temperature can be effectively lowered compared to a no-restriction control. That is, without affecting the normal operation of the motor 3, heat generation in the smoothing capacitor 32 can be effectively limited to extend the product life of the capacitor 32.

In the present embodiment, the initial value and the measured value are measured based on the voltage Vc during the precharge. When the static capacitance decreases due to the deterioration of the capacitor 32, the charging speeds up (e.g., the capacitor 32 is charged more quickly) and the slope of the voltage Vc (e.g., as shown in FIG. 3) becomes steeper. By recognizing the initial value and the measured value respectively as values based on the voltage Vc, the static capacitance correlation value can be easily measured using a simple configuration.

The measurement of the initial value and the measure value may consider a precharge time, which is a required time for the voltage Vc to rise from the threshold voltage Vth1 to reach the threshold voltage Vth2. A voltage higher than zero (0) V is set as the threshold voltage Vth1, A voltage lower than the minimum operation voltage of the motor 3 is set as the threshold voltage Vth2. That is, even if the vehicle battery 2 has deteriorated, the microcomputer 70 of the motor drive device can still perform the deterioration determination of the smoothing capacitor 32. As such, even when the power supply voltage VDD fluctuates, it is still possible to stably measure a value that is correlated with the static capacitance.

In the present embodiment, the shipment state is set as the initial state of the smoothing capacitor 32 and the motor drive device 10. At the time of shipment (e.g., shipment of the vehicle/motor drive device 10 from the OEM/factory), the static capacitance is set to a predetermined value. As such, the deterioration determination can be performed without being influenced by variations in the capacitance of the smoothing capacitor 32 that occur over time, and in such manner, it is possible to accurately determine the deterioration of the smoothing capacitor 32.

Second Embodiment

The present embodiment is based on, and refers to, the preceding embodiment. As such, a repeat description of like parts and features of the motor drive device 10 already described in the preceding embodiment may be omitted in the description of the present embodiment.

In the present embodiment, the restriction unit 75 is configured to restrict the maximum rotation number in stages, that is, in a stepwise manner, based on the degree of deterioration of the smoothing capacitor 32, as determined by the determination unit 74.

Figure 7:
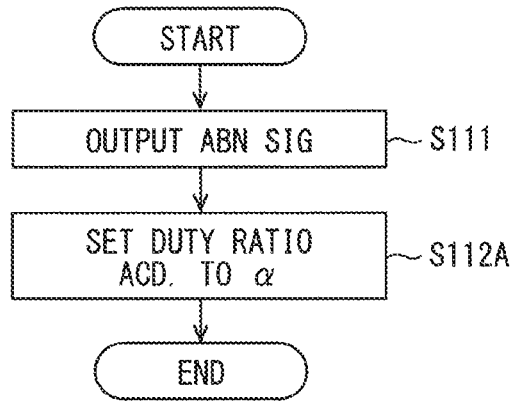
FIG. 7 is a flowchart of the rotation number restriction process in a motor drive device in a second embodiment of the present disclosure.

FIG. 7 shows the rotation number restriction process. Similar to the preceding embodiment, at S111, the restriction unit 75 of the present embodiment performs an abnormality signal output process. At S112A, the restriction unit 75 sets a duty ratio based on the change rate $\alpha$. The process at S112A corresponds to the above-described process at S112.

Figure 8:
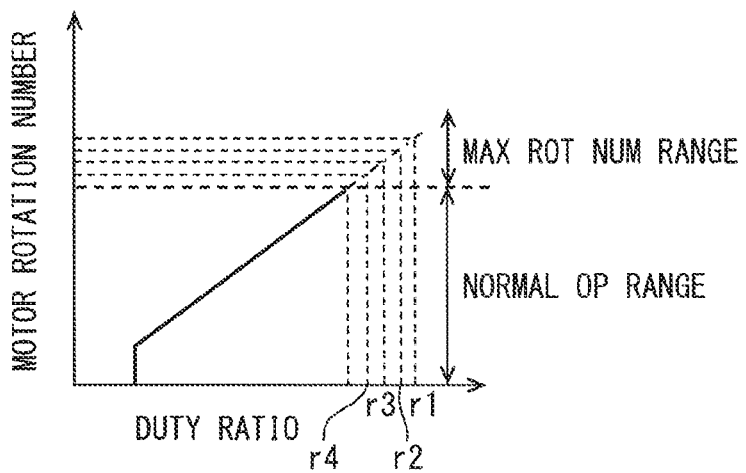
FIG. 8 is a relational diagram of a duty ratio and a motor rotation number.

The duty ratio r1 shown in FIG. 8 is a duty ratio set in cases where there is no deterioration in the smoothing capacitor 32, as described in the preceding embodiment. The restriction unit 75 sets the duty ratios r2, r3, and r4 when the microcomputer 70 determines that the smoothing capacitor 32 is deteriorating. When the change rate $\alpha$ is equal to or greater than the threshold $\alpha$th, but the change rate $\alpha$ is still relatively small, the duty ratio r2 is set. When the change rate $\alpha$ is equal to or greater than the threshold $\alpha$th and has a moderate value, the duty ratio r3 is set. When the change rate $\alpha$ is equal to or greater than the threshold $\alpha$th and is relatively large, the duty ratio r4 is set.

That is, the determination unit 74 is configured to determine a degree of deterioration in the capacitor 32, and the restriction unit 75 is configured to restrict the maximum rotation number of the motor 3 in a stepwise manner based on the degree of deterioration of the capacitor 32.

In the present embodiment, it is possible to set the duty ratio corresponding to the maximum rotation number based on the degree of deterioration of the smoothing capacitor 32. As such, it is possible to maintain the rotation number of the motor 3 as high as possible while maintaining a lower water temperature and limiting the further deterioration of the smoothing capacitor 32.

The disclosure of the specification is not restricted to the above-described embodiments. For example, the disclosure is not limited to the combination of elements shown in those embodiments, and the disclosure can be implemented in various combinations.

The motor drive device 10 in the present disclosure is applied to the motor 3 as part of a radiator fan, but the present disclosure is not limited to such an arrangement.

Figure 9:
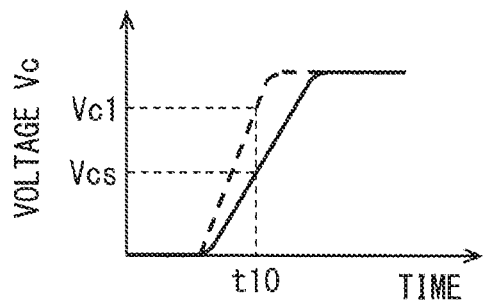
FIG. 9 is a voltage diagram for a modification of the embodiments.

The precharge time tp is measured as a static capacitance correlation value of the smoothing capacitor 32, and is described as an example, but the present disclosure is not limited to such measurement. For example, in the first modification shown in FIG. 9, the voltage Vc may be measured at time t10 during the precharge, where time t10 occurs at a predetermined amount of time after the start of the precharge. In other words, time t10 occurs after a predetermined amount of time lapses after the start of the precharge. The solid line shown in FIG. 9 shows the change in the voltage Vc in the initial state (i.e., at the time of shipment), and the broken line shows the change in the voltage Vc at the time of measurement.

As described above, when the static capacitance decreases due to deterioration, the charge time decreases (e.g., capacitor 32 may be charged more quickly) and the slope of the voltage Vc becomes greater. As such, as shown in FIG. 9, the initial voltage value Vcs and the measured voltage value Vc1 at time t10 are respectively different values, where the measured value Vc1 at time t10 is greater than the initial voltage value Vcs. Based on this difference, the microcomputer 70 can determine the deterioration of the capacitor 32 based on the change of the measured voltage value Vc1 relative to the initial voltage value Vcs.

Although not illustrated, when the static capacitance of the capacitor 32 decreases due to deterioration, the ripple in the voltage Vc increases during the switching of the inverter 20. In such manner, it is also possible to determine deterioration based on changes in the voltage ripple.

As described above, the microcomputer 70 includes the storage unit 72, the calculation unit 73, the determination unit 74, and the restriction unit 75 as example components. However, the present disclosure is not limited to this example arrangement and configuration using a microcomputer 70. For example, in place of a microcomputer 70, a control IC including such components may be used. The control IC may be, for example, an application-specific integrated circuit (ASIC) or a field-programmable gate array (FPGA) programmed to perform the example processes described for the various embodiments and modifications.

As described in the above example, the control unit 71 of the microcomputer 70 controls the inverter 20. However, the present disclosure is not limited to such example control. For example, a higher-level ECU such as the engine ECU 5 may control the inverter 20. The control instruction for the inverter 20 may be output by the high-level ECU to the motor drive device 10 so that the restriction unit 75 can output an abnormality signal indicative of deterioration in the capacitor 32 to the high-level ECU. In this way, the high-level ECU can restrict the maximum rotation number accordingly. In such a case, the restriction unit 75 restricts the maximum rotation number by performing the process at S111.

As the rotation number restriction process, the restriction unit 75 may perform the processes shown at S112 and S112A, without performing the process at S111.

Figure 10:
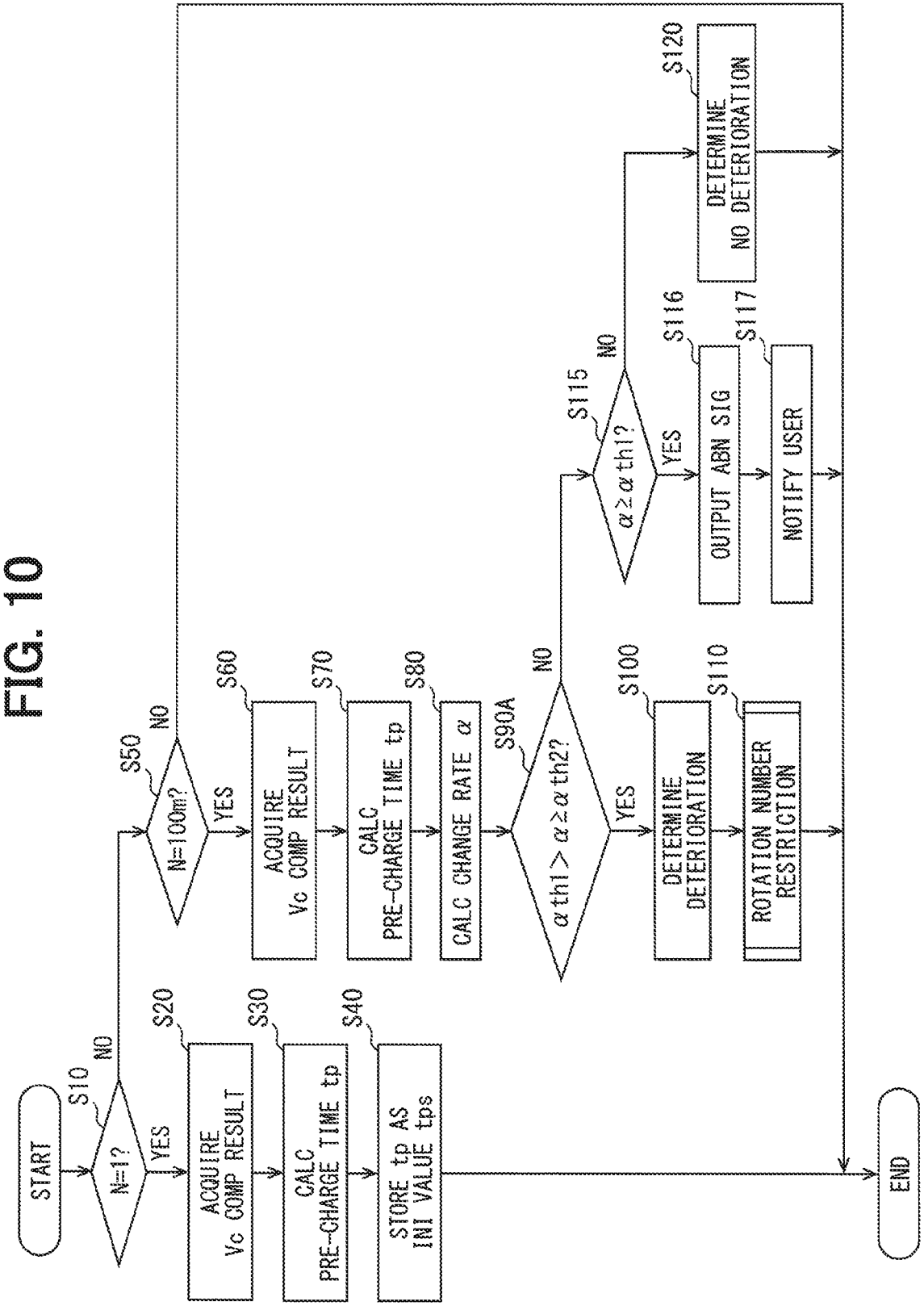
FIG. 10 is a flowchart of process performed by a microcomputer in a second modification of the embodiments.

A second modification is shown in FIG. 10, where, in addition to determining deterioration in the smoothing capacitor 32, the microcomputer 70 may also perform a product life determination (e.g., determine a product life of the capacitor 32). The processes at S10 to S80, S100, S110, and S120 are the same as those in FIG. 2.

Upon completion of S80 for calculating the change rate α, at S90A the determination unit 74 then determines whether the calculated change rate α satisfies αth1>α≥αth2 with respect to preset thresholds αth1 and αth2. The threshold αth1 is a threshold value for determining the product life. The threshold αth2 is a threshold value for determining deterioration and corresponds to the above-described threshold αth. As described above, the change rate α is a reduction rate, that is, how much the precharge time of the capacitor 32 has been reduced. As such, the change rate α acts as an index of deterioration for the capacitor 32. Based on the above-described relation αth1>α≥αth2, not only can the deterioration of the capacitor 32 be ascertained based on the value of the change rate α relative to the deterioration threshold αth2, but the remaining product life of the capacitor 32 can be determined based on the value of the change rate α relative to the product life threshold αth1. The processes performed by the microcomputer 70 of the motor drive device 10 of the present modification may better assist vehicle repair technicians, engineers, and the vehicle operator in determining the remaining product life of the capacitor 32 once it has been determined that the capacitor 32 is starting to deteriorate. In such manner, the capacitor 32 may be timely replaced before the end of its product life. In the above-described embodiments, the product life threshold (i.e., αth1 in this modification) may have, for example, a value around 30% (i.e., about 30% deterioration). The deterioration threshold (i.e., αth2 in this modification) may have, for example, a value around 20% (i.e., about 20% deterioration).

When αth1>α≥αth2 is satisfied, i.e., "YES" at S90A, the process proceeds to S100 and the determination unit 74 determines that the smoothing capacitor 32 has deteriorated. At S110, the restriction unit 75 performs the rotation number restriction process for restricting the maximum rotation number of the motor 3. After the microcomputer 70 performs the process at S110, the process shown in FIG. 10 ends.

On the other hand, when αth1>α≥αth2 is not satisfied, i.e., "NO" at S90A, the process proceeds to S115 and the determination unit 74 then determines whether the change rate α satisfies the relation α≥αth1. When the determination unit 74 determines that the change rate α is equal to or greater than the threshold value αth1, i.e., "YES" at S115, the process proceeds to S116 and the microcomputer 70 outputs an abnormality signal to the engine ECU 5. As a result of receiving the abnormality signal, the engine ECU 5 may perform a fail-safe process. At S117, the microcomputer 70 notifies a vehicle occupant (e.g., driver) that an abnormality has occurred, for example, via a display notification, warning light, auditory warning, or as a combination of these notifications. After the microcomputer 70 performs the process at S117, the process shown in FIG. 10 ends.

At S115, when α≥αth1 is not satisfied, i.e., "NO" at S115, the process proceeds to S120, where the determination unit determines that the change rate α is less than the threshold αth1 based on the determination at S115, and less than the threshold αth2 based on the determination of S90A. At S120 the determination unit determines there is no deterioration in the smoothing capacitor 32, and the process shown in FIG. 10 ends.

Although the shipment state at the time of vehicle shipment is shown as the initial state, it is not limited to such an example. For example, instead of a first ignition at the factory (i.e., first ignition ON) as the initial state, the first ignition ON after vehicle purchase by a user may be set as the initial state (i.e., first ignition ON after vehicle purchase), In the above-described embodiments, the deterioration determination is described as being performed when the amount "N" of ignitions ignition ON) is a multiple of 100 (e.g., 100 m). However, the present disclosure is not limited to such multiples, and the performance of the deterioration determination process may be performed at any frequency.

Although the present disclosure has been fully described in connection with embodiments with reference to the accompanying drawings, it is to be noted that various changes and modifications will become apparent to those skilled in the art, and such changes, modifications, and summarized schemes are to be understood as being within the scope of the present disclosure as defined by the appended claims.

What is claimed is:

1. A motor drive device comprising:
  a storage unit configured to store an initial value of a static capacitance correlation value that is correlated with a static capacitance of a smoothing capacitor in an initial state when the smoothing capacitor is connected to an inverter that drives a motor;
  a measurement unit configured to measure the static capacitance correlation value of the smoothing capacitor as a measured value;
  a determination unit configured to determine a deterioration of the smoothing capacitor based on the static capacitance correlation value measured by the measurement unit, and the initial value; and
  a restrictor configured to restrict a maximum rotation number of the motor when the determination unit determines the deterioration of the smoothing capacitor,
  wherein the motor has a motor rotation range that includes a normal operation range controlled by a closed-loop control where the motor rotates at a normal rotation number within the normal operation range, and a maximum rotation number range controlled by an open-loop control where the motor rotates at the maximum rotation number within the maximum rotation number range, wherein the maximum rotation number is greater than the normal rotation number, and
  wherein the restrictor is further configured to restrict the maximum rotation number within the maximum rotation number range.

2. The motor drive device of claim 1, wherein
  the determination unit is further configured to determine a degree of deterioration in the capacitor, and wherein
  the restrictor is further configured to restrict the maximum rotation number in a stepwise manner based on the degree of deterioration.

3. The motor drive device of claim 1, wherein
  the smoothing capacitor is charged by a precharge circuit before a power supply relay is turned on, and wherein
  the initial value is based on an inter-terminal voltage of the smoothing capacitor during charging by the precharge circuit in the initial state, and
  the measured value is based on the inter-terminal voltage of the smoothing capacitor during charging by the precharge circuit after the initial state.

4. The motor drive device of claim 3, wherein
the measurement unit is further configured to measure a precharge time that is a rise time of the inter-terminal voltage from a first threshold to a second threshold, and wherein
the second threshold is lower than a minimum operation voltage of the motor, and wherein
the first threshold is greater than 0V.

5. The motor drive device of claim 1, wherein
the initial state is a shipment state, the shipment state being a time after a manufacture of a vehicle in which the motor drive device is installed, after an ignition switch in the vehicle is initially switched on for a first time.

\* \* \* \* \*